United States Patent [19]
Erb

[11] Patent Number: 5,182,029
[45] Date of Patent: Jan. 26, 1993

[54] AQUEOUS PHOTORESIST WASTE TREATMENT BY ACID/CUPRIC CHLORIDE PRECIPITATION

[75] Inventor: Allen J. Erb, Austin, Tex.

[73] Assignee: International Business Machines Corporation, Armonk, N.Y.

[21] Appl. No.: 800,344

[22] Filed: Nov. 26, 1991

[51] Int. Cl.$^5$ .................................................. C02F 1/52
[52] U.S. Cl. .................................... 210/724; 210/908
[58] Field of Search ................ 210/723, 724, 726, 908

[56] References Cited

U.S. PATENT DOCUMENTS

| | | | |
|---|---|---|---|
| 4,760,014 | 7/1988 | Wong | 210/726 |
| 4,761,239 | 8/1988 | Wardell | 210/736 |
| 4,857,206 | 8/1989 | Choo | 210/709 |
| 4,999,114 | 3/1991 | Choo | 210/709 |

*Primary Examiner*—Wilbur Bascomb, Jr.
*Assistant Examiner*—Neil M. McCarthy
*Attorney, Agent, or Firm*—Duke W. Yee

[57] ABSTRACT

A process is disclosed for treating an aqueous waste stream containing a photoresist waste component. Under this process the pH of the waste stream is adjusted in a range from about 4.0 to about 6.0 and an additive is added to the waste stream in a concentration effective to separate a precipitant from the waste solution in the form of a non-sticky residue. The additive is selected from the group consisting of $FeCl_3$, $CuCl_2$, $NH_4Cl$, $AlCl_3$, and combinations thereof.

5 Claims, No Drawings

AQUEOUS PHOTORESIST WASTE TREATMENT BY ACID/CUPRIC CHLORIDE PRECIPITATION

BACKGROUND OF THE INVENTION

1. Field of the Invention

The present invention relates in general to the handling and disposal of waste water effluents of the type produced during the manufacture of printed circuit boards and, in particular, to a method for removing aqueous photoresist waste from a waste water stream prior to discharging the waste water stream. Still more particularly, the present invention provides an improved method for removing aqueous photoresist waste through acid precipitation that does not produce a sticky precipitate.

2. Description of the Prior Art

Several techniques are known in the prior art for manufacturing printed circuit boards in which a light sensitive substrate is "exposed" to create a desired pattern. For instance, in one such technique, a board having a photoresist film covering a copper surface is masked such that the desired pattern is exposed to ultraviolet light. The board is developed in a sodium carbonate or potassium carbonate system stripping the unexposed photoresist film. As a result, the unexposed sections have no film covering the copper. Next, the board is etched to remove the exposed copper areas and then, the board is stripped in a sodium hydroxide or potassium hydroxide solution to remove the remaining photoresist film.

A developer solution and a stripping solution are used to remove the photoresist film from the board. Considerable interest exists regarding the handling and disposal of these waste water effluents in attempting to comply with increasingly restrictive environmental regulations and sewering codes. Since these photoresists are an integral part of the circuit board manufacturing process, the solutions generated from the developing and stripping of the photoresists become a part of a waste stream that often needs to be treated before discharging this waste stream, for example, into the local sewer system.

In many instances, it is desirable to remove the photoresist from the waste stream. Removal of the photoresist may involve acid treatment and carbon absorption. In acid treatment, acid is added to the waste stream to decrease the pH which causes the photoresist to precipitate out of solution. One problem with this acid treatment is that a gummy, sticky precipitate may occur. Such a precipitate cannot be clarified, filtered, or pumped by standard means. Therefore, it would be desirable to have a method of acid treatment that would not produce a gummy, sticky precipitate.

SUMMARY OF THE INVENTION

It is therefore one object of the present invention to provide a novel method for the handling and disposal of waste water effluents.

It is another object of the present invention to provide a novel method for treating and removing aqueous photoresist waste.

It is yet another object of the present invention to provide a novel method for removing aqueous photoresist waste through acid precipitation that does not produce a sticky precipitate.

The foregoing objects are achieved according to the process of the invention. The process of the present invention includes a process for treating a waste solution containing an aqueous photoresist waste as a component of the waste solution. Under this process the waste solution is adjusted to a pH in the range from about 4.0 to about 7.0 and an additive is added to the waste solution in a concentration effective to separate out the photoresist waste component as a precipitate from the waste solution, the precipitate being in the form of a non-sticky residue. The additive is preferably selected from the group consisting of metal chlorides, ammonium chloride and salts thereof. Most preferably, the additive is selected from the group consisting of $FeCl_2$, $CuCl_2$, $AlCl_3$, $NH_4Cl$, and combinations thereof.

The above as well as additional objects, features, and advantages of the invention will become apparent in the following detailed description.

DETAILED DESCRIPTION OF THE INVENTION

The novel features believed characteristic of the invention are set forth in the appended claims. The invention itself however, as well as a preferred mode of use, further objects and advantages thereof, will best be understood by those skilled in the art upon reading the following detailed description of the invention in conjunction with the appended claims.

The aqueous waste stream resulting from manufacturing printed circuit boards contains several constituents which will be referred to herein collectively as the "photoresist waste component" of the stream. Basically, the photoresist waste component will be taken to mean those constituents left in the aqueous waste stream resulting from the application of the photoresist to the board substrate and subsequent exposure, development, stripping and washing of the substrate. For instance, in a typical process, these constituents include, e.g., the dry film photoresist that has been removed from the board along with the stripper and developer solutions. The developing and stripping solutions may be 0.8% sodium carbonate and 2% sodium hydroxide with an anti-foaming agent in both solutions. Commercially available photoresists include Du Pont's RISTON 3100 and 3300 Series photoresists (available from E. I. du Pont de Nemours and Company, Inc. under the trade names RISTON 3100 and RISTON 3300) and will be familiar to those skilled in the art.

In the preferred method of practicing the invention, the pH of the waste solution is adjusted with an acid solution in the range from about 4.0 to about 7.0. In addition, the acid solution contains an additive in a concentration effective to separate the photoresist waste component as a precipitate from the aqueous waste stream as a non-sticky, non-gummy residue. After precipitation, the precipitate is removed from the aqueous waste stream and the stream is discharged in conventional manner. For instance, the stream may be discharged directly into the local sewer system, or it may be routed to a waste treatment plant for further processing other components of the aqueous waste stream. For instance, it may be necessary to remove copper ions from solution using lime precipitation, adjust the oxygen content, or adjust other characteristics of the discharge stream.

Under a preferred embodiment for treating the photoresist waste component, a hydrochloric acid solution containing cupric chloride at a concentration greater than 1 gram per liter is added to the aqueous waste stream until the pH of the waste stream is in the range from about 4.0 to about 7.0, most preferably about 4.0 to about 5.0. In adjusting the pH level, a lower limit of about 3.5 and an upper limit of about 8.0 are recommended. Adjusting the pH to a limit too low will result in a gummy precipitate even in the presence of cupric chloride. The most preferred range is from about 4.0 to 5.0.

The hydrochloric acid useful in the practice of the invention can be obtained from a number of commercial sources and is usually marketed in concentrations of about 38% HCl.

Cupric chloride (copper bi- or dichloride, $CuCl_2.2H_2O$, m.w. 170.49) is also commercially available as green orthorhombic crystals which may be blush-green depending on a slight difference in the water content. The amount of cupric chloride that performs best under a preferred embodiment of the invention is in a concentration in the acid solution in the range of 3.0 to 20.0 grams per liter.

One economical source of cupric chloride is the waste stream from a cupric chloride etch process. This liquid is highly concentrated in cupric chloride. A portion of this liquid can be diluted with water and mixed with acid to form a mixture of the proper concentrations.

Another source of cupric chloride is sludge obtained from lime precipitation of waste products from manufacturing printed circuit boards. The sludge contains copper hydroxide from the manufacturing process and cupric chloride may be obtained by redissolving the sludge in HCl.

Alternately, the unfiltered metal hydroxide sludge can be mixed directly with the aqueous resist stream and then treated with dilute acid to obtain similar results. This method will in general require more copper usage.

After the pH range of 4.0 to 5.0 is reached, the hydrochloric acid solution, containing cupric chloride, is no longer added to the waste stream. At this pH range, the photoresist waste component has been found to precipitate out of the aqueous waste stream to form a flocculant that can be easily clarified or filtered using conventional waste water treatment facilities.

Normally acid pH adjustment results in a gummy, sticky precipitate which is not easily clarified, filtered or pumped by standard means. The cupric chloride additive causes the precipitate to form a non-gummy precipitate which is easily separated from the waste stream.

Although cupric chloride is the most preferred additive, other additives may be used in the acid pH adjustment step. Additional additives are preferably selected from the group consisting of $FeCl_3$, $NH_4Cl$, $AlCl_3$ and combinations thereof in a concentration effective to cause a separation of the precipitate from the waste stream as a non-sticky, non-gummy residue. In addition, other acids, for example, $H_2SO_4$ may be used for adjusting the pH of the waste solution, depending upon the overall waste treatment plan. For instance, the use of $H_2SO_4$ is not desired in many instances due to the increased sulfate levels which would be produced in the treated stream. Some municipalities and cities limit the amount of sulfate discharge.

In a preferred method of practicing the invention, the cupric chloride is added at the same time as the acid to the waste stream. This is conveniently accomplished by mixing the cupric chloride with the acid solution prior to the step of adding the acid/cupric chloride solution to adjust the pH of the waste stream.

After removal of the precipitate from the waste stream, the waste stream may be sent on for further processing or discharged into the local sewer system.

EXAMPLE

In utilizing the present invention, a mixture of cupric chloride and HCl was prepared. The formulation utilized to minimize cupric chloride usage was 5 grams per liter copper in a 2.5N HCl solution. Concentrations of less than 5 grams per liter of copper will work, but yield a very fine precipitate which settles slowly. Moreover, high concentrations of copper also work well but the resulting filtrate is high in cupric chloride which must be removed in subsequent treatment steps.

The aqueous photoresist waste stream contained a mixture of developing and stripping solutions for Dupont 3100 and 3300 photoresists. The aqueous photoresist stream had a pH of about 12.5. The cupric chloride/hydrochloric acid mixture was added quickly until pH reached about 8. At this point, good mixing and slow addition of the titrating solution was essential to prevent the formation of a gummy precipitate. Titration was completed at a pH of about 4.2. Good mixing of the aqueous photoresist waste and the cupric chloride/hydrochloric acid mixture was done to allow release of carbon dioxide resulting from the sodium carbonate and the hydrochloric acid to prevent sludge from rising to the top of the solution instead of settling to the bottom.

After stirring was ceased, the solids rapidly settled to the bottom leaving a liquid phase that was clear and pale blue. The solids were not sticky and could be easily poured from one container to another. Filtering of the sludge to remove water caused a 90% reduction in the volume of the sludge.

The filtrate was highly concentrated in copper (over 800 ppm) and contained about 20 to 30% of the original organics. This stream was readily treated by existing technologies to remove the copper and remaining organics. The raw materials used and products were:
1000 ml Aqueous Resist Waste
4 ml etching solution (170 g/l Cu++, 2.5N HCl)
30 ml 37% HCl
100 ml water
7.5 ml of pressed sludge (75 ml of wet sludge)
1100 ml of filtrate

| | Analytic Results: | | |
|---|---|---|---|
| | BOD (mg/l) | COD (mg/l) | Copper (mg/l) |
| Test Description 02/07/90 | | | |
| Aqueous Resist Waste | 255 | 11800 | 15.1 |
| AR Filtrate after $CuCl_2$/HCl precipitation | 228 | 1940 | 781 |
| AR Filtrate after Lime Precipitation | 371 | 1750 | 0.12 |
| Test Description 04/02/90 | | | |
| Aqueous Resist Waste | 2440 | 10600 | 4.8 |
| AR Filtrate after $CuCl_2$/HCl precipitation | 817 | 3100 | 457 |

BOD - Biochemical oxygen demand determines the oxygen requirements of waste waters using microorganisms. It is widely used in measuring waste loadings to treatment plants. A 5-day period has been accepted as a standard.
COD - Chemical oxygen demand is a measure of organic matter that is susceptible to oxidation by a strong chemical oxidizing agent.
TOC - Total organic carbon measures organic content by oxidation to carbon dioxide in a heated tube. The resultant carbon dioxide is detected by instrument.
AR - Aqueous photoresist.

In removing organics from filtrate, biological treatment units or carbon absorption may be used; copper may be removed by lime precipitation and clarification. Furthermore, the sludge may be incinerated.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A process for treating an aqueous waste stream containing a photoresist waste component which comprises the steps of:

adding an acid solution containing cupric chloride in a concentration of at least 1.0 gram per liter to the waste stream to lower the pH of the waste stream;

stopping the step of adding the acid solution after the photoresist waste components has separated from the aqueous waste stream as a precipitate; and removing the precipitate from the waste stream.

2. The process of claim 1, wherein the removing step comprises filtering the waste stream to remove the precipitate from the waste stream.

3. The process of claim 2, wherein the stopping step further comprises stopping adding the acid when the pH of the waste stream is lowered in the range from about 4.0 to 7.0.

4. The process of claim 3, wherein the cupric chloride in acid solution is present in a concentration in the range from about 3.0 grams per liter to about 20.0 grams per liter.

5. The process of claim 4, wherein the acid solution is a hydrochloric acid solution.

* * * * *